(12) United States Patent
Nozoe et al.

(10) Patent No.: US 6,952,960 B2
(45) Date of Patent: Oct. 11, 2005

(54) RECTIFIER UNIT AND RECTIFIER ATTACHING STRUCTURE

(75) Inventors: Satoshi Nozoe, Toyonaka (JP);
Toshimitsu Fujiwara, Kusatsu (JP);
Hidenari Kuribayashi, Fuchu (JP);
Osamu Makino, Kurayoshi (JP);
Tatsuhide Morisawa, Kurayoshi (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 10/869,749

(22) Filed: Jun. 16, 2004

(65) Prior Publication Data

US 2004/0261519 A1 Dec. 30, 2004

(30) Foreign Application Priority Data

Jun. 30, 2003 (JP) .......................... P2003/188856

(51) Int. Cl.$^7$ ................................ G01F 1/68
(52) U.S. Cl. ................................. 73/204.21
(58) Field of Search ...................... 73/204.21, 204.25, 73/861.22, 198; 138/44, 39, 40; 162/343, 162/344

(56) References Cited

U.S. PATENT DOCUMENTS 4,504,360 A * 3/1985 Fujiwara ............... 162/343
4,841,781 A * 6/1989 Khalifa .................. 73/861.22
5,255,716 A * 10/1993 Wilcox .................... 138/44
6,401,531 B1 * 6/2002 Tank et al. ............. 73/204.21

OTHER PUBLICATIONS

Patent Abstracts of Japan, Publication No. 02-263117, Publication Date: Oct. 25, 1990, 1 page.

* cited by examiner

Primary Examiner—Edward Lefkowitz
Assistant Examiner—Jewel V. Thompson
(74) Attorney, Agent, or Firm—Osha-Liang LLP

(57) ABSTRACT

A spacer has an annular concave portion, at one end face, to accept a rectifier that rectifies fluid flowing through a flow channel in a flowmeter, a protruding annular convex portion, at the other end face, of a size to fit in the annular concave portion, and fixing means, on an outer surface, for fixing the spacer to a tube of the flow channel through engagement. A rectifier unit is temporarily assembled by integrating the spacer and the rectifier that are provided alternately in series in an axial direction into a tubular unit. It is thus possible to achieve efficient assembly, by which plural rectifiers are inserted and attached inside the tube through a single insertion operation. Moreover, it is possible to address a need for a reduction of rectifiers in size or a change to the specifications regarding the number of rectifiers to be provided.

5 Claims, 12 Drawing Sheets

RECTIFIER UNIT AND RECTIFIER ATTACHING STRUCTURE

BACKGROUND OF THE INVENTION

1. Field of the Invention

The present invention relates to a rectifier unit equipped to a flowmeter that measures a flow volume of fluid, and more particularly to a rectifier unit and a rectifier attaching structure with enhanced rectifier attaching capability.

2. Description of the Related Art

For a rectifier attached to a flowmeter, as is shown in FIG. 12, a flow sensor 124 serving as a flow rate sensor is generally attached to an intermediate portion of a flow channel 123 defined to transversely penetrate through a main body 122 of a flowmeter 121. The flow sensor 124 measures a flow rate produced within the flow channel with the use of a flow chip, and outputs the measurement result in the form of a voltage, on the basis of which a flow volume is measured.

Incidentally, in order to stabilize the measuring ability of the flow sensor 124, rectifiers 125, such as rectifier wire meshes, each rectifying fluid flowing from the upstream side of the flow sensor 124 to a homogeneous flow, are provided at regular intervals with spacers 126 being interposed along a flow channel direction (see, for example, JP-A-2-263117). Further, in order to close the portion of the spacers 126 in a reliable manner and prevent the fluid from leaking, a coupler 128 is attached while a sealing O-ring 127 is interposed at the end face of the flow channel 123 on the lead-in side.

With such a rectifier attaching structure, however, a rectifier and a spacer are alternately inserted one by one in the tube from an opening of a lead-in tube of the flow channel to be pushed sequentially to the deepest portion of the lead-in tube, and this insertion operation has to be repeated as many times as the number of components that need to be attached, which makes the job quite troublesome. In particular, a time needed for the insertion operation is extended as the diameter of the flow channel is reduced with a reduction in size and the rectifiers and the spacers become smaller as well, which lowers the working efficiency and deteriorates the assembling performance. In addition, there is a limit in reducing the size or the number of components due to the need for a coupler to keep the opening side of the spacers closed.

Further, there is a possibility that a rectifier and a spacer are inserted in a wrong order or skipped by mistake. In such a case, the rectifiers are not provided at regular intervals, and the originally expected rectifying function cannot be achieved. Moreover, once the rectifiers are attached inside the lead-in tube, there is no way to confirm whether the rectifiers are attached adequately. In addition, it is impossible to address a need for a change to the specifications regarding the number of rectifiers to be provided, because no adjustment can be made. For example, when a need for a change to the specifications is to reduce the number of rectifiers to be provided from the predetermined regular number, in a space where the rectifiers and the spacers are to be provided, a total length in the channel flow direction becomes shorter by a thickness of the reduced rectifier(s), which gives rise to a clearance equivalent to the reduction. The clearance may possibly cause the leakage of fluid, and it is therefore difficult to add a change to the specifications.

SUMMARY OF THE INVENTION

The invention therefore has an object to provide a rectifier unit and a rectifier attaching structure that enable efficient assembly to be achieved, by which plural rectifiers are readily inserted and attached inside the tube through a single insertion operation, and that can address a reduction of the flowmeter in size and a change to the specifications regarding the number of rectifiers to be provided.

One aspect of the invention provides a rectifier unit characterized by being provided with a spacer having an annular concave portion, at one end face, to accept a rectifier that rectifies fluid flowing through a flow channel in a flowmeter, a protruding annular convex portion, at the other end face, of a size to fit in the annular concave portion, and fixing means, on an outer surface, for fixing the spacer to a tube of the flow channel through engagement, and by being formed by integrating the spacer and the rectifier that are provided alternately in series in an axial direction into a tubular unit.

The rectifier referred to herein can be formed from a rectifier wire metal or an orifice capable of achieving the rectification function. Not only the same kind of rectifiers, but also different kinds of rectifiers can be combined.

The fixing means referred to herein is to fix the spacer and the tube through engagement, and the spacer per se can be formed to have the fixing portion with respect to the tube. For example, the fixing means can be formed by providing a locking portion where the concave-to-convex correspondence is achieved between the inner surface of the tube and the outer surface of the spacer.

The spacers referred to herein not only secure intervals to provide the rectifiers at regular intervals in the flow channel direction, but also include the annular concave portion and convex portion at the front end face and the rear end face, respectively, so that plural spacers of the same shape can be linked in the axial direction. Thus, by fitting the annular convex portion of the following spacer in the annular concave portion of a given spacer while the rectifier is inserted in the annular concave portion, these two spacers can be linked to each other with the rectifier being interposed therebetween. By repeating such linking of spacers in this manner, it is possible to temporarily assemble a single, tubular rectifier unit provided with as many rectifiers as needed.

According to the invention, because as many rectifiers as needed are assembled temporarily in the rectifier unit before the rectifiers are attached to the tube, when the rectifiers are attached to the tube, plural rectifiers can be attached at a time by merely inserting the rectifier unit once. The rectifiers can be thus attached efficiently in a short time by saving labor.

Also, when the flowmeter is reduced in size, the diameter of the flow channel is reduced, which in turn makes the rectifiers and the spacers smaller; however, these components can be still assembled temporarily at the outside. Moreover, because they can be attached by a single insertion operation, the assembling performance will not be deteriorated even when the size is reduced.

Further, the rectifier unit can be assembled temporarily by confirming the presence or the absence of the rectifier for each spacer during a temporary assembling work before being inserted in the tube. Also, by making the respective spacers attachable/detachable at the linked portion where the concave-to-convex correspondence is achieved, it is possible to confirm the presence or absence of the rectifier even after the rectifier unit is temporarily assembled, by detaching a spacer of interest from the linked spacer.

Even when there is a need for a change to the specifications regarding the number of rectifiers to be provided, this need can be addressed due to the presence of the spacers having the unique concavo-convex shapes. For example, in a case where the number of the rectifiers to be provided needs to be less than the regular number, merely a spacer accommodating the rectifier and an empty spacer accommodating no rectifier are linked. Even when fewer rectifiers are used, the respective spacers are fit in one another through the concave-to-convex correspondence, and no rattling will occur in the axial direction. Hence, there will be no dimensional error. The invention can be thus adapted to a case where the number of the rectifiers needs to be reduced, and is able to address the need for a change to the specifications regarding the number of the rectifiers to be provided. Further, the respective spacers forming the rectifier unit are the same components and can be used commonly, which enables the mass-production and the cost reduction of the spacers to be achieved.

Another aspect of the invention provides a rectifier attaching structure, characterized in that: a rectifier unit, attached inside a lead-in tube in front of a flow rate sensor provided to an intermediate portion of a flow channel in a flowmeter, includes a spacer having an annular concave portion, at one end face, to accept a rectifier that rectifies fluid flowing through the lead-in tube, a protruding annular convex portion, at the other end face, of a size to fit in the annular concave portion, and a locking claw, on an outer surface, for fixing the spacer to the lead-in tube through engagement, and is formed by integrating the spacer and the rectifier that are provided alternately in series in an axial direction into a tubular unit; and after the rectifier unit is inserted in the lead-in tube, a spacer positioned at an outer end of the rectifier unit is rotated to allow the locking claw of the spacer to engage with an engaging portion of the lead-in tube, thereby fixing the spacer to the lead-in tube so as not to fall out.

In this case, by rotating a single spacer positioned at the outer end of the rectifier unit inserted in the lead-in tube, the locking claw of the spacer engages with the engaging portion of the lead-in tube. The rectifier unit can be thus locked with the lead-in tube so as not to fall out. The rotating operation can be readily achieved by rotating the spacer from the outside of the lead-in tube, for example, with the use of a jig.

According to still another aspect of the invention, an insertion guiding groove to guide the locking claw to be inserted may be formed in an inner surface of the lead-in tube in an axial direction, and a locking portion may be provided by forming a notched locking groove communicating with the insertion guiding groove, so that the locking claw of the spacer, opposing the insertion guiding groove at an outer end of the lead-in tube after insertion, is allowed to rotate from the insertion guiding groove in a circumferential direction.

In this case, by rotating one spacer positioned at the outer end of the rectifier unit, the locking claw of the spacer engages with the locking groove of the lead-in tube, and they are locked integrally with each other. It is thus possible to attach the spacers and the lead-in tube integrally by providing a single spacer with the locking function. This makes it possible to achieve an attaching structure omitting a member, such as a coupler. Hence, not only can the attaching structure suitable for a reduction in size be achieved, but also the cost can be saved by reducing the number of components.

According to still another aspect of the invention, the rectifier unit may be attached while a spring washer is interposed between opposing surfaces of a deepest portion of the lead-in tube and an inner end face of the rectifier unit inserted in the lead-in tube.

In this case, by attaching the rectifier unit to the lead-in tube by interposing the spring washer therebetween, it is possible to achieve a maintaining function of a loose-less, integrally linked state among all the spacers positioned between the deepest portion of the lead-in tube and the locking claw at the outer end of the lead-in tube, due to the elastic function of the spring washer.

According to still another aspect of the invention, the rectifier unit may be inserted and attached to a lead-out tube in the rear of the flow rate sensor provided at the intermediate portion of the flow channel in the flowmeter.

In this manner, the attachment position of the rectifier unit is not limited to the lead-in tube side, and it can be attached to the lead-out tube side as well. When the rectifier unit is attached to the lead-out tube side, it plays a role of preventing intrusion of dust from the lead-out tube side, as well as a role of suppressing the influences of pulsation. For example, in a case where a pump is used as an example of the pulsation, a change in pressure occurs inside the tube. However, the rectifier unit suppresses the pulsation so as not to give adverse influences to the rectification characteristic.

DETAILED DESCRIPTION OF THE INVENTION

One embodiment of the invention will now be described with reference to the accompanying drawings.

Figure 1:
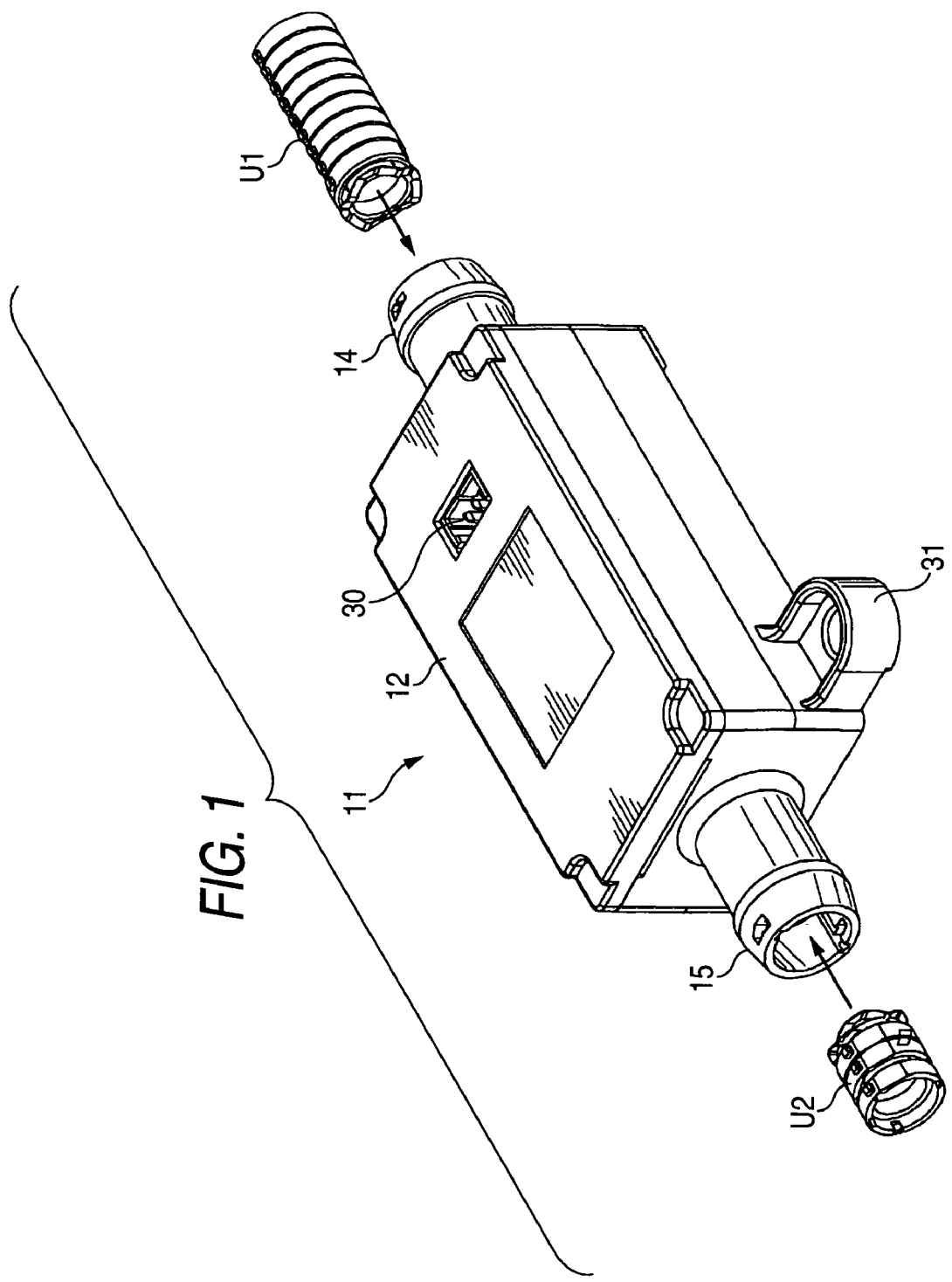
FIG. 1 is a perspective view showing an outward appearance of a flowmeter, indicating a manner in which rectifier units are attached.
Figure 2:
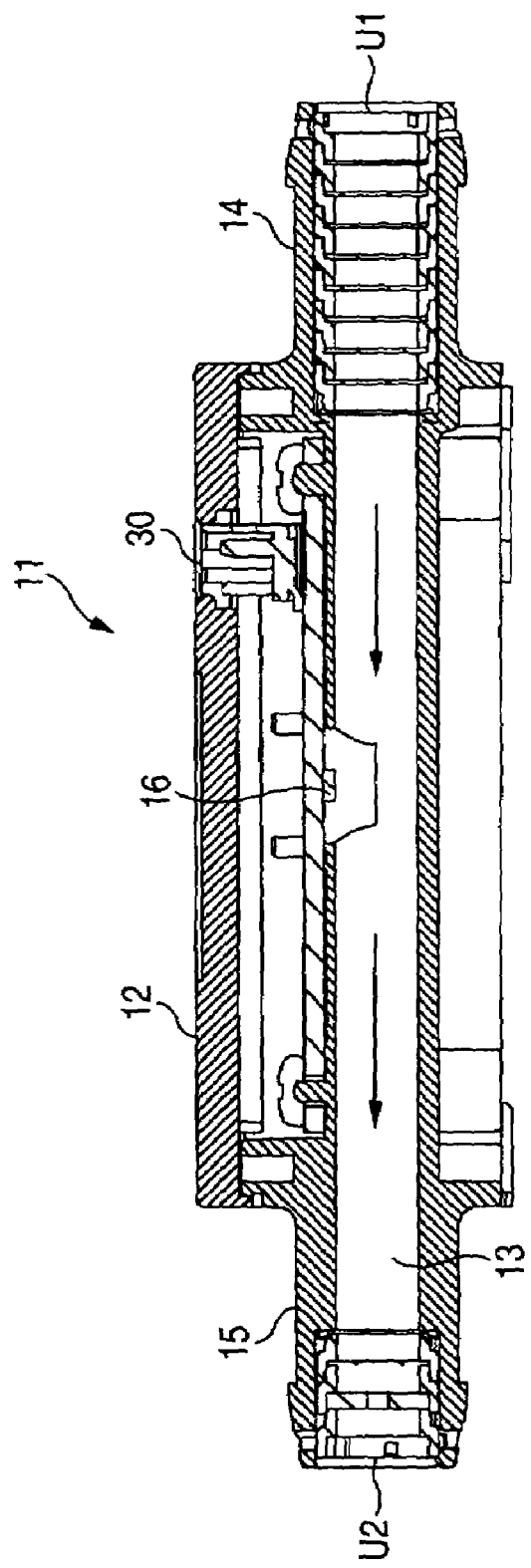
FIG. 2 is a longitudinal cross section of the flowmeter to which the rectifier unit is attached.

The accompanying drawings show the attaching structure of rectifier units to be attached to a flowmeter. Referring to FIG. 1 and FIG. 2, a flowmeter 11 includes a flow channel 13 in the shape of a straight tube that transversely penetrates through a rectangular main body 12 in the longitudinal direction. The flowmeter 11 is provided with a lead-in tube 14 protruding forward to serve as an inflow piping portion, at the inflow side of the flow channel 13, and a lead-out tube 15 protruding backward to serve as an outflow piping portion, at the outflow side. A flow sensor 16, serving as a flow rate sensor, is engaged upon the intermediate portion of the flow channel 13 to measure a flow volume of a gas flowing through the flow channel 13.

A first rectifier unit U1 is attached inside the lead-in tube 14 to make a flow rate distribution homogeneous by eliminating an irregularity in flow rate. A second rectifier unit U2 is also attached inside the lead-out tube 15 to suppress influences from the lead-out side, such as a change in pressure.

Figure 3:
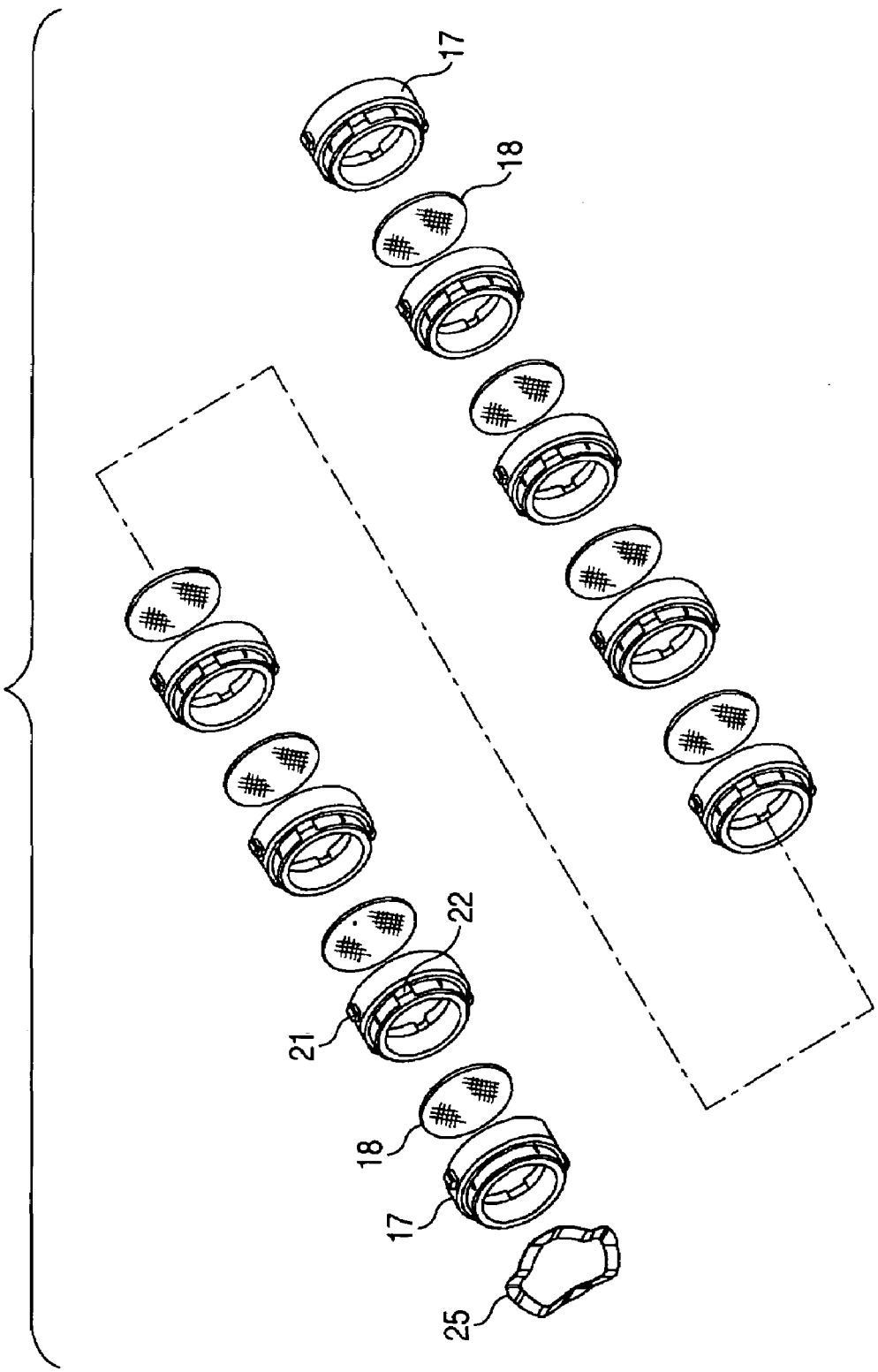
FIG. 3 is a developed perspective view of a first rectifier unit.
Figure 4:
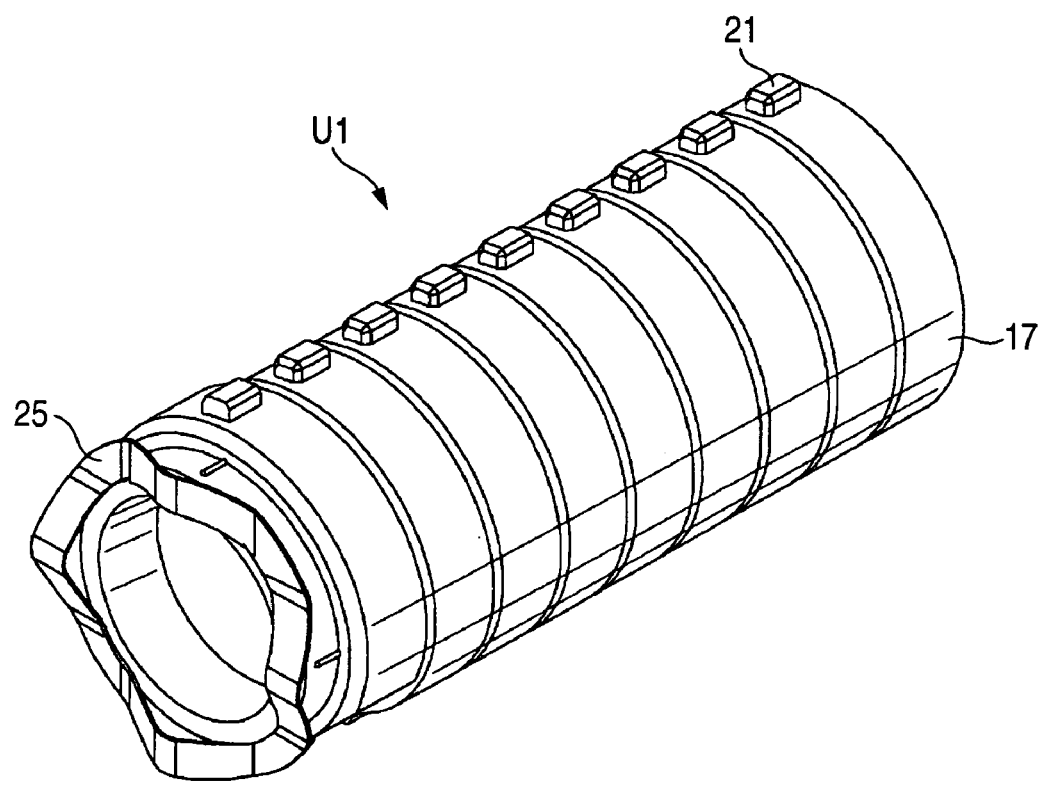
FIG. 4 is a perspective view showing an outward appearance of the first rectifier unit.

As are shown in FIG. 3 and FIG. 4, the first rectifier unit U1 is formed by integrating plural spacers 17 of the identical shape and plural meshes 18 of the identical shape, provided alternately in series in the axial direction, into a tubular unit.

Figure 5:
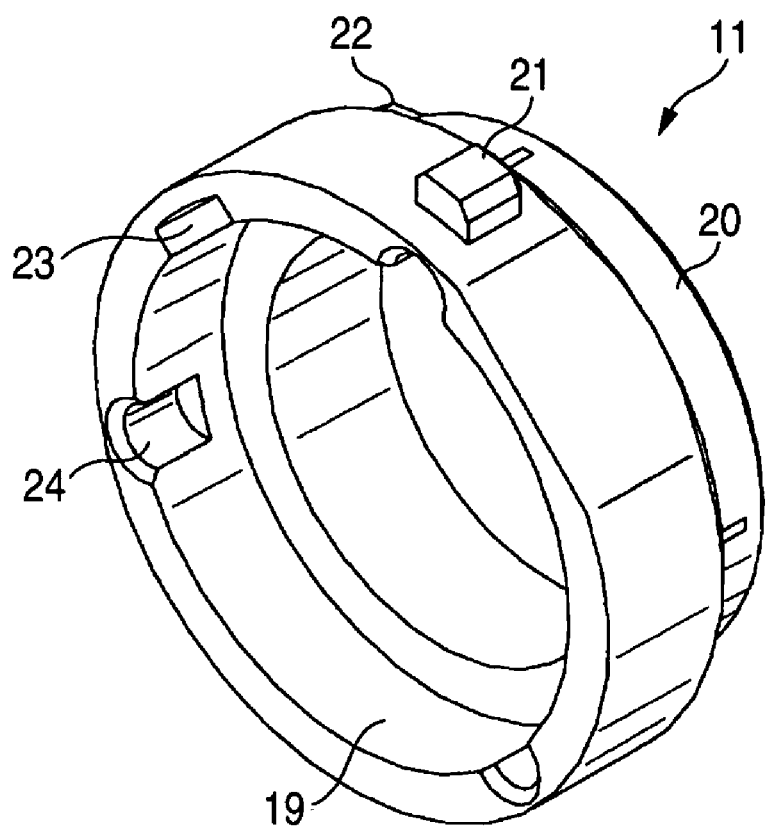
FIG. 5 is an enlarged perspective view of a spacer.

As is shown in FIG. 5, each spacer 17 includes an annular concave portion 19 to accept the disc-like mesh 18 at one end face (rear end) of the tube, and a protruding annular convex portion 20 of a size to fit in the annular concave portion 19 at the other end face (front end) of the tube, and is thereby formed as a stepped tube having a large diameter portion and a small diameter portion in parallel in the axial direction of the tube.

The annular concave portion 19 is set to have a sufficient concave depth to pinch the thin mesh 18 between the inner surface of the annular concave portion 19 and the annular convex portion 20 of another spacer 17 when the annular convex portion 20 of another spacer 17 is fit in the annular concave portion 19 after the mesh 18 is inserted in pinching the mesh 18 therebetween.

Figure 6:
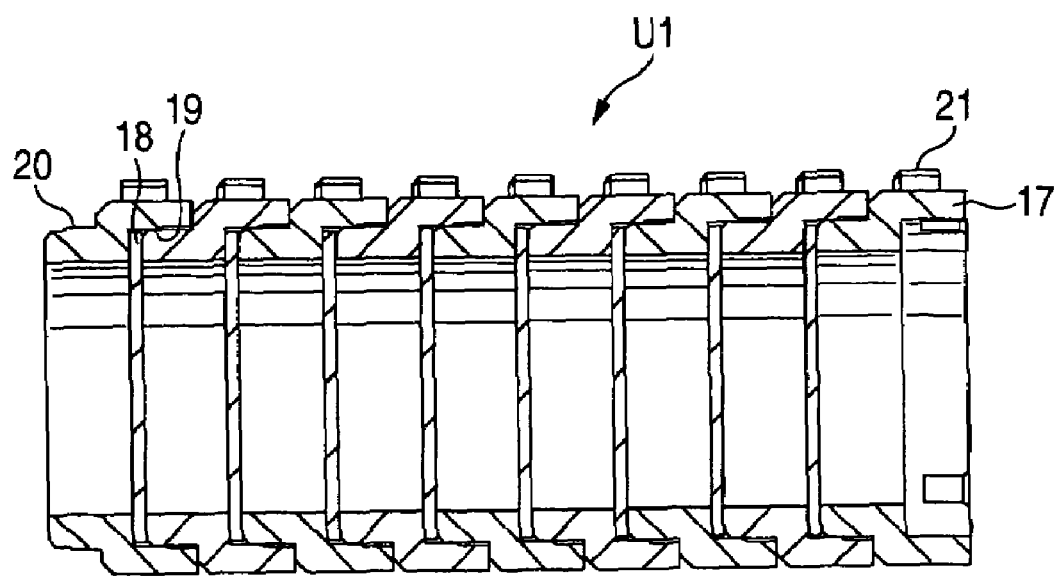
FIG. 6 is a longitudinal cross section of the first rectifier unit.

Hence, by fitting the annular convex portion 20 of one spacer 17 in the annular concave portion 19 of the other spacer 17 while the mesh 18 is inserted in the annular concave portion 19, as is shown in FIG. 6, it is possible to link the two spacers 17 with the mesh 18 being interposed therebetween. By linking two spacers 17 repetitively in this manner, the tubular first rectifier unit U1 provided with as many meshes 18 as needed can be assembled temporarily as a single unit.

Also, the fitting strength between the annular concave portion 19 and the annular convex portion 20 is set to achieve a relatively loose linking state such that allows the linked spacers 17 to rotate at the linked portion during a locking operation described below.

Further, convex protrusions serving as small locking claws 21 are provided at the top and bottom on the outer surface of the large diameter portion of the spacer 17, and these locking claws 21 engage with the lead-in tube 14 described below for fixation. Also, a positioning protrusion 22 is provided on part of the outer surface of the small diameter portion of the spacer 17, and when two spacers 17 are linked, the positioning protrusion 22 of one spacer 17 engages with a positioning groove 23 formed in an inner surface of the annular concave portion 19 of the other spacer 17. By achieving this positioning engagement, the protruding locking claws 21 on the outer surface of the first rectifier unit U1 assembled by linking the respective spacers 17 can be aligned linearly in the axial direction, which makes the attachment to the lead-in tube 14 described below easier.

Besides the positioning groove 23, a jig attaching groove 24 (see FIG. 5) is formed in the inner surface of the annular concave portion 19 for a spacer rotating operation to attach the spacers 17 to the lead-in tube 14 by rotating the spacers 17.

Used as the mesh 18 is a thin disc made of an extremely fine wire mesh or the like capable of rectifying a gas flowing through the flow channel 13, and of a size small enough to be accommodated in the annular concave portion 19 of the spacer 17.

As has been described, because as many meshes 18 as needed for rectification can be temporarily assembled in the first rectifier unit U1, when the meshes 18 are attached to the lead-in tube 14, they can be attached by merely inserting the first rectifier unit U1 in the form of a single unit into the lead-in tube 14 once.

When the first rectifier unit U1 is attached to the lead-in tube 14, it is suitable to incorporate an annular, corrugated spring washer 25 together with the first rectifier unit U1. By incorporating the spring washer 25, the first rectifier unit U1 becomes able to exert a function of providing a loose-less, integrally linked state among all the spacers 17 present from the deepest portion of the lead-in tube 14 to the outer end of the lead-in tube 14, due to the elastic function of the spring washer 25.

Figure 7:
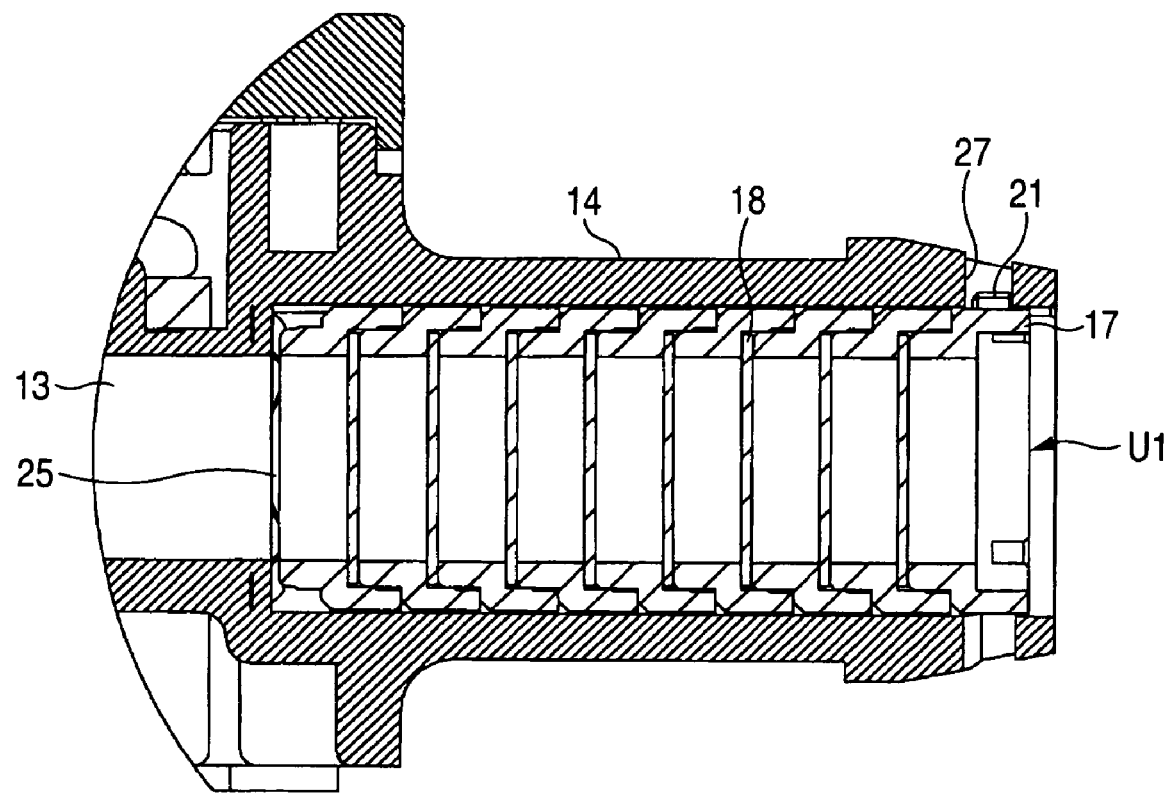
FIG. 7 is a longitudinal cross section showing a major portion when the first rectifier unit is attached.
Figure 8:
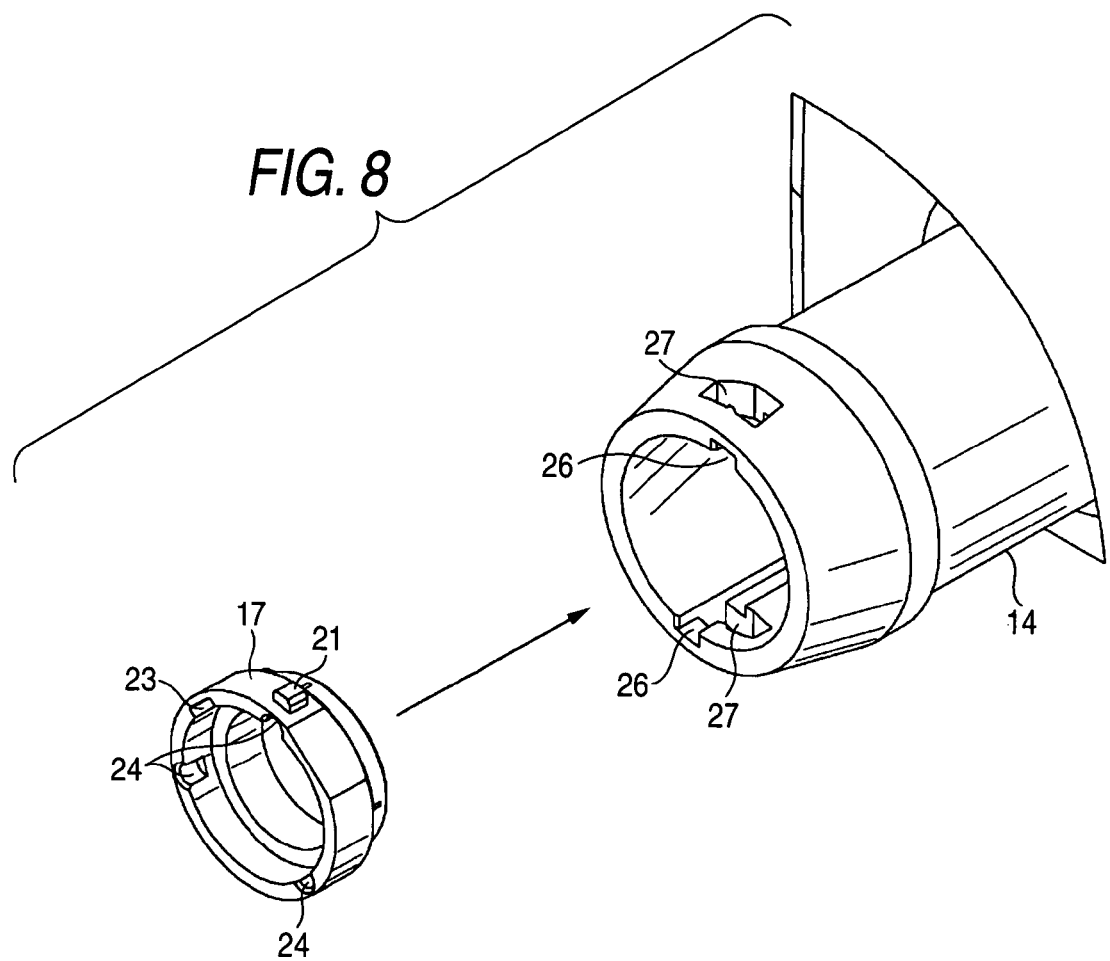
FIG. 8 is a perspective view showing a major portion in a locking correspondence portion between a spacer and a lead-in tube.

An engagement structure of the first rectifier unit U1 and the lead-in tube 14 will now be described with reference to FIG. 7 and FIG. 8.

Concave insertion guiding grooves 26, each guiding the locking claw 21 to be inserted along the axial direction, are formed at the top and bottom on the inner surface of the lead-in tube 14 in the axial direction. Thus, by inserting the first rectifier unit U1 after the locking claws 21 aligned in the axial direction and protruding at the top and bottom of the first rectifier unit U1 are positioned at the insertion guiding grooves 26 at the top and bottom through concave-to-convex correspondence, the first rectifier unit U1 can be attached to the lead-in tube 14 while the locking claws 21 are guided to be inserted in the insertion guiding grooves 26.

Further, notched locking grooves 27 communicating with the insertion guiding grooves 26 are formed. These locking grooves 27 allow the locking claws 21 on the top and bottom of the spacer 17, opposing the insertion guiding grooves 26 at the outer end of lead-in tube 14 after insertion, that is, when the first rectifier unit U1 is inserted as far as the deepest portion of the lead-in tube 14, to rotate slightly from the insertion guiding grooves 26 in the circumferential direction.

For this reason, when the first rectifier unit U1 is attached to the lead-in tube 14, by rotating, from the outside, one spacer 17 positioned at the outer end of the first rectifier unit U1, which is the only one spacer 17 that is exposed through the opening end of the lead-in tube 14, the locking claws 21 on the top and bottom of this spacer 17 engage with the locking grooves 27 on the top and bottom of the lead-in tube 14. The first rectifier unit U1 is thus locked integrally with the lead-in tube 14, which in turn fixes the former to the latter so as not to fall out.

When one spacer 17 positioned at the outer end of the lead-in tube 14 is rotated, the spacer 17 is rotated by placing an unillustrated jig in the jig attaching groove 24 of the spacer 17. That is, only a single spacer 17 positioned at the outer end of the lead-in tube 14 is rotated while the rest of the spacers 17 are left intact. In this instance, the concave-to-convex fitting state between the spacer 17 positioned at the outer end of the first rectifier unit U1 and the spacer 17 linked to the inner side thereof is a fitting state such that allows the former spacer 17 to rotate during the locking operation.

The degree of engagement between the positioning protrusion 22 of the spacer 17 at the outer end and the positioning groove 23 in the annular concave portion 19 of the spacer 17 at the inner side is set to an engagement degree sufficiently low to allow the spacer 17 at the outer end to rotate by surmounting the positioning engaging portion.

By including the engagement structure that provides the spacer per se with the locking function, it is possible to achieve an attaching structure with respect to the lead-in tube 14 by omitting a coupler.

Figure 9:
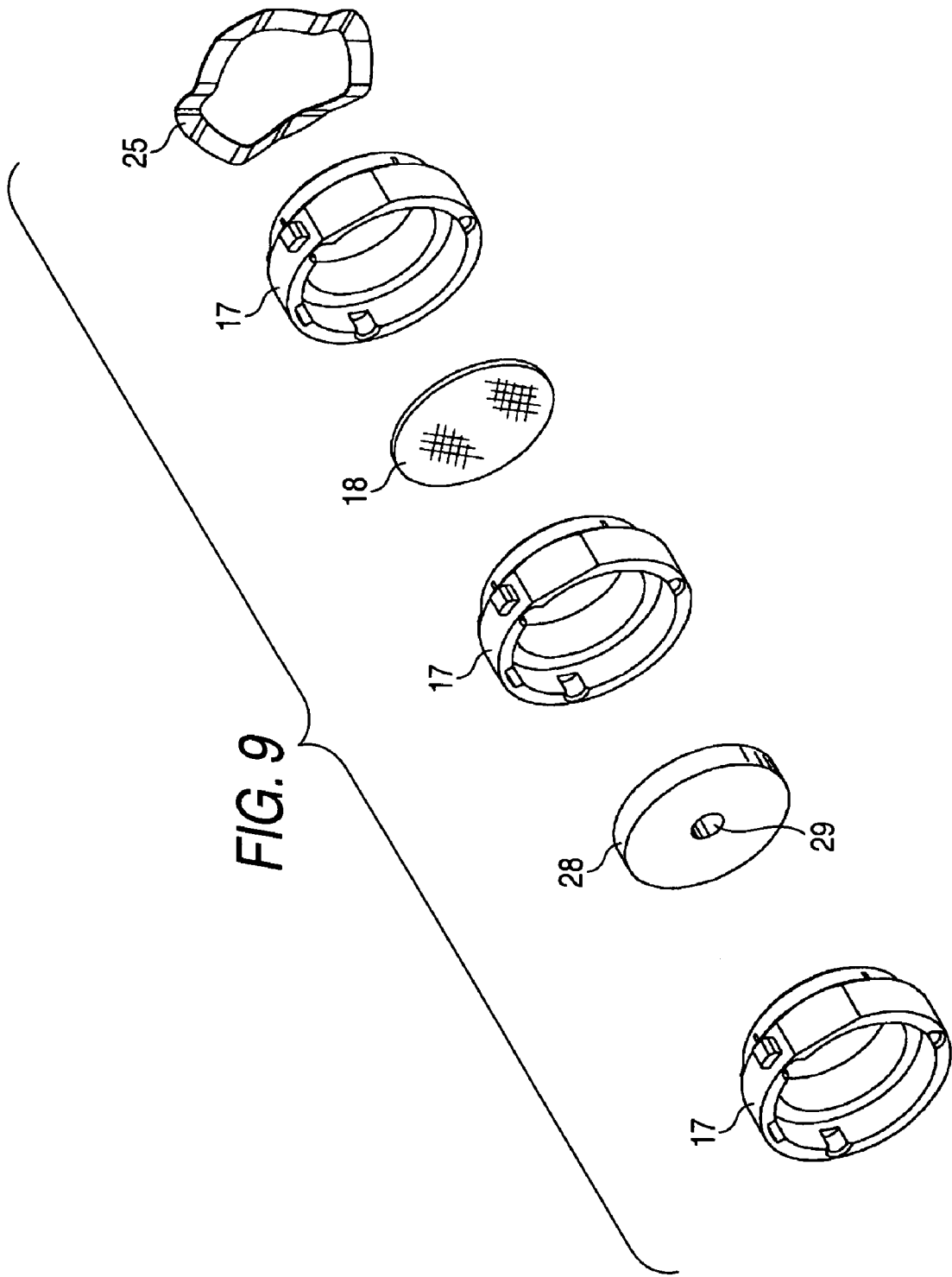
FIG. 9 is a developed perspective view of a second rectifier unit.
Figure 10:
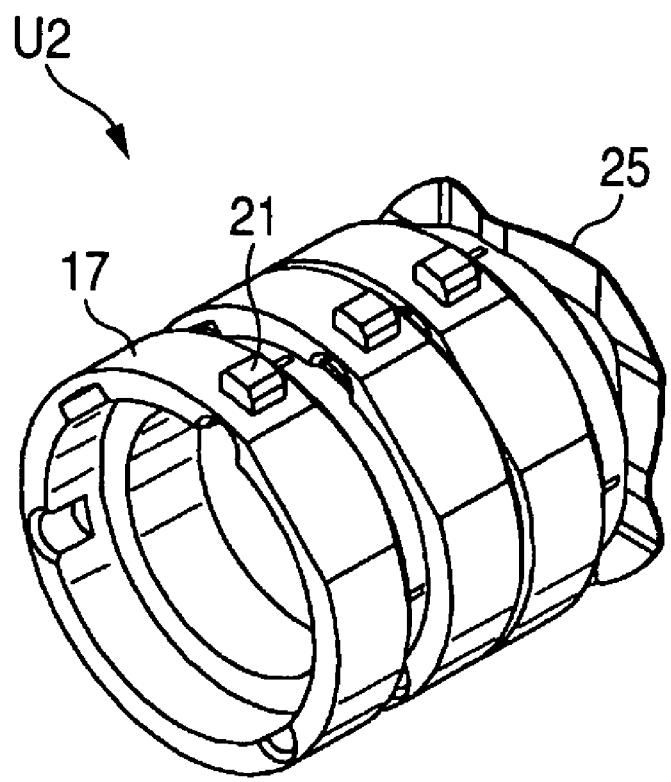
FIG. 10 is a perspective view showing an outward appearance of the second rectifier unit.
Figure 11:
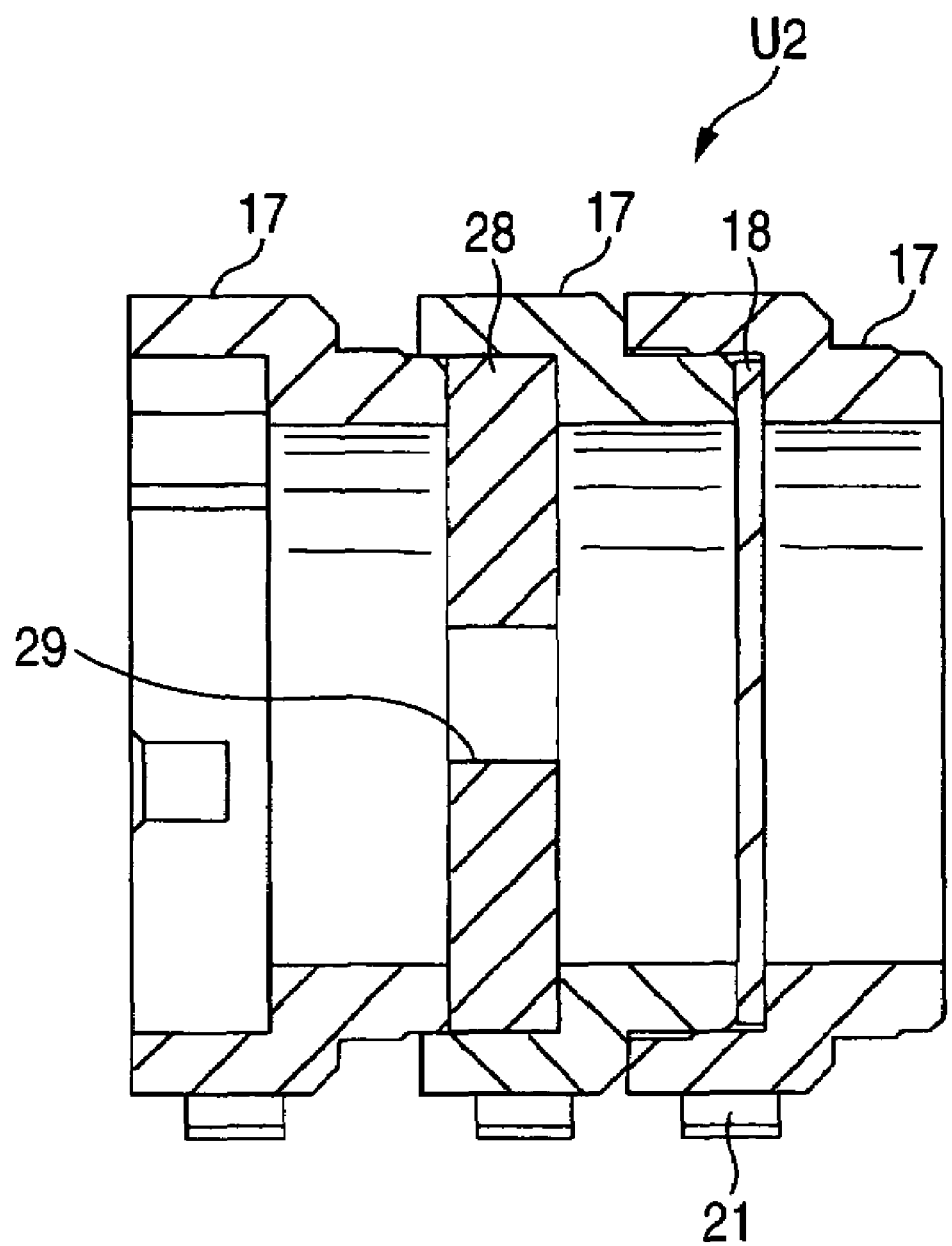
FIG. 11 is a longitudinal cross section of the second rectifier unit.
Figure 12:
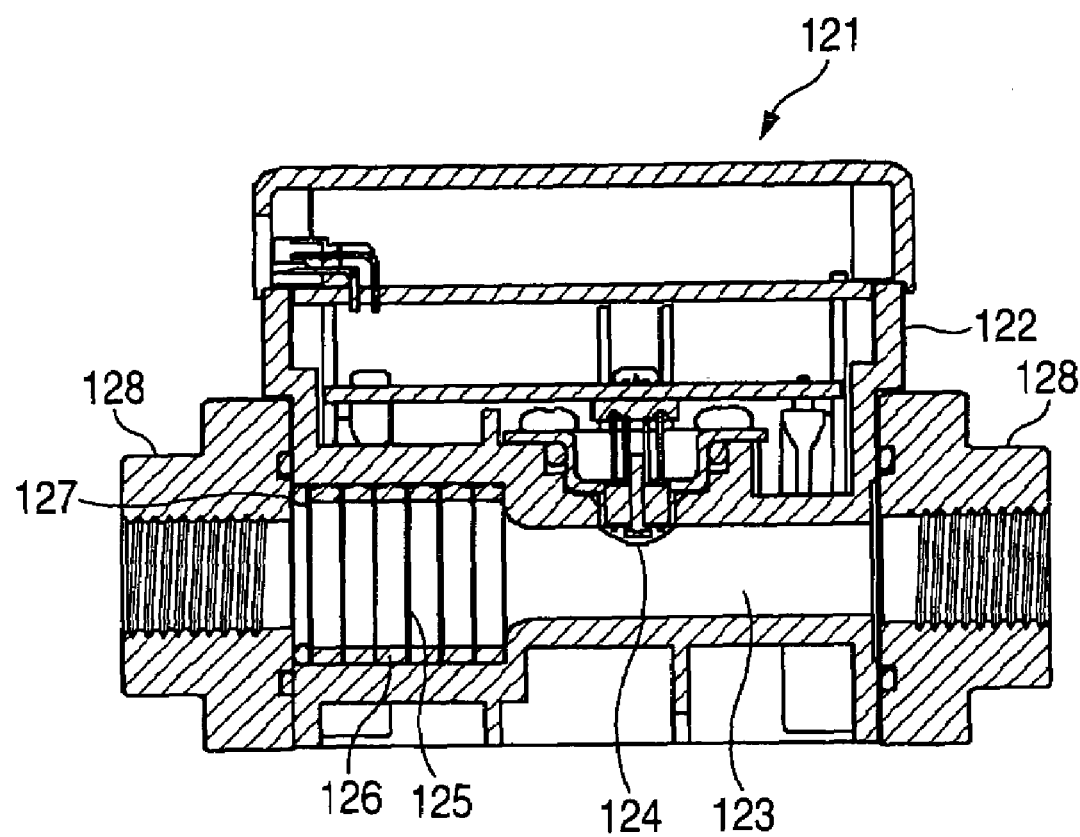
FIG. 12 is a longitudinal cross section of a conventional flowmeter.

The second rectifier unit U2 will now be described. The second rectifier unit U2 is configured substantially in the same manner as the first rectifier unit U1 described above, and as are shown in FIG. 9 through FIG. 11, the differences are that fewer spacers 17 are used (three in the drawings) and one mesh 18 is replaced with one orifice 28. The following description will describe only these differences.

The orifice 28 has a disc of the same size as the meshes 18, which is small enough to be accommodated in the annular concave portion 19 of the spacer 17, and is provided with a central hole 29 slightly opened at the center. This configuration makes it possible to suppress adverse influences from the lead-out tube 15 side, such as a change in pressure.

Hence, even when an L-shaped bent tube is connected immediately before the flowmeter 11, no turbulence is generated in the flow due to the stabilizing function of the orifice 28. Also, even when a pump or the like is used, although a change in pressure occurs inside the tube, the pulsation at this instance can be suppressed by the orifice 28.

The second rectifier unit U2 is attached to the lead-out tube 15 in the rear of the flowmeter 11 by being inserted therein, in the same manner as the first rectifier unit U1.

When the second rectifier unit U2 is attached to the lead-out tube 15 side in this manner, it plays a role of preventing intrusion of dust from the lead-out tube 15 side, as well as a role of suppressing influences from a change in pressure or the like. Referring to FIG. 1 and FIG. 2, reference numerals 30 and 31 denote a connector and a main body fixing portion, respectively.

When the first rectifier unit U1 configured as described above is attached to the lead-in tube 14, the spring washer 25 is inserted through the opening end of the lead-in tube 14 first, and thence the first rectifier unit U1 is inserted to the deepest portion of the lead-in tube 14 while the locking claws 21 at the top and bottom of the first rectifier unit U1 are engaged with the insertion guiding grooves 26 at the top and bottom of the lead-in tube 14. Finally, by slightly rotating the spacer 17 positioned at the opening end of the lead-in tube 14 with an unillustrated jig, the locking claws 21 on the top and bottom are locked in the locking grooves 27 of the lead-in tube 14. The first rectifier unit U1 is thus fixed integrally to the lead-in tube 14 so as not to fall out.

As has been described, the tubular first rectifier unit U1 only has to be inserted when it is attached to the lead-in tube 14, which makes it possible to attach plural meshes 18 at a time. The assembler is thus able to finish the attaching job efficiently in a short time by saving labor.

Likewise, when the second rectifier unit U2 is attached to the lead-out tube 15, the spring washer 25 is inserted through the opening end of the lead-out tube 15 first, and thence the second rectifier unit U2 is inserted to the deepest portion of the lead-out tube 15 while the locking claws 21 on the top and bottom of the second rectifier unit U2 are engaged with the insertion guiding grooves 26 at the top and bottom of the lead-out tube 15. Finally, by slightly rotating the spacer 17 positioned at the opening end of the lead-out tube 15 with the use of an unillustrated jig, the locking claws 21 at the top and bottom are locked in the locking grooves 27 of the lead-out tube 15. The second rectifier unit U2 is thus fixed integrally to the lead-out tube 15 so as not to fall out.

In this case, too, the tubular second rectifier unit U2 only has to be inserted when it is attached to the lead-out tube 15, which makes it possible to attach the meshes 18 and the orifice 28 efficiently at a time.

Hence, a number of identical spacers 17 and meshes 18 can be attached to the lead-in tube 14 and the lead-out tube 15 without having to be attached one by one. This eliminates a possibility that these components are attached in a wrong order or skipped by mistake.

Further, due to the structure in which the spacers 17 and the meshes 18 are integrated into a unit to be attached at a time, not only can the attaching operation be simpler, but also a suitable attaching structure for a reduction of the flowmeter in size can be achieved. To be more specific, even when the diameter of the flow channel is reduced with a reduction in size, and the meshes and the spacers become smaller as well, these components can be assembled temporarily in a unit. More importantly, they can be attached through a single insertion operation. Hence, there is no deterioration in assembling performance even when the size is reduced.

Furthermore, the presence or absence of the mesh or the orifice can be confirmed for each spacer from the outside of the lead-in tube and the lead-out tube during a temporary assembling work. Also, the embodiment can be adapted to a case where the number of the meshes 18 to be provided to the lead-in tube 14 or the lead-out tube 15 needs to be less than the regular number. In this case, merely a spacer 17 accommodating the mesh 18 and an empty spacer 17 accommodating no mesh 18 are linked. Even when fewer meshes 18 are used, the respective spacers 17 are fit in one another through the concave-to-convex correspondence, and no rattling will occur in the axial direction. Hence, there will be no dimensional error. The embodiment can be therefore adapted to a case where the number of the meshes 18 needs to be reduced, and is thus able to address a need for a change to the specifications.

Moreover, the respective spacers 17, forming stepped-tubes used as the rectifier units U1 and U2, are the same components and can be used commonly, which enables the mass-production and the cost reduction of the spacers 17 to be achieved.

According to the invention, as many rectifiers as needed are assembled temporarily in the rectifier unit in advance, so that when attached to the lead-in tube or the lead-out tube of the flowmeter, plural rectifiers can be attached exactly at a time. It is thus possible to achieve the efficient attachment in a short time by saving labor.

It should be appreciated that the invention can be modified based on the technical ideas presented in the appended claims, and is not limited to the embodiment described above.

What is claimed is:

1. A rectifier unit, including:
    a spacer having an annular concave portion, at one end face, to accept a rectifier that rectifies fluid flowing through a flow channel in a flowmeter, a protruding annular convex portion, at the other end face, of a size to fit in said annular concave portion, and fixing means, on an outer surface, for fixing said spacer to a tube of said flow channel through engagement,
    wherein said rectifier unit is formed by integrating said spacer and said rectifier that are provided alternately in series in an axial direction into a tubular unit.

2. A rectifier attaching structure, wherein:
    a rectifier unit, attached inside a lead-in tube in front of a flow rate sensor provided to an intermediate portion of a flow channel in a flowmeter, includes a spacer having an annular concave portion, at one end face, to accept a rectifier that rectifies fluid flowing through said lead-in tube, a protruding annular convex portion, at the other end face, of a size to fit in said annular concave portion, and a locking claw, on an outer surface, for fixing said spacer to said lead-in tube through engagement, said rectifier unit being formed by integrating said spacer and said rectifier that are provided alternately in series in an axial direction into a tubular unit; and after said rectifier unit is inserted in said lead-in tube, a spacer positioned at an outer end of said rectifier unit is rotated to allow said locking claw of said spacer to engage with an engaging portion of said lead-in tube, thereby fixing said spacer to said lead-in tube so as not to fall out.

3. The rectifier attaching structure according to claim 2, wherein:

an insertion guiding groove to guide said locking claw to be inserted is formed in an inner surface of said lead-in tube in an axial direction; and a notched locking groove communicating with the insertion guiding groove is formed, so that the locking claw of said spacer, opposing said insertion guiding groove at an outer end of said lead-in tube after insertion, is allowed to rotate from said insertion guiding groove in a circumferential direction.

4. The rectifier attaching structure according to claim 2, wherein:

said rectifier unit is attached while a spring washer is interposed between opposing surfaces of a deepest portion of said lead-in tube and an inner end face of said rectifier unit inserted in said lead-in tube.

5. The rectifier attaching structure according to any of claims 2, 3, and 4, wherein:

said rectifier unit is inserted and attached to a lead-out tube in the rear of the flow rate sensor provided at the intermediate portion of said flow channel in said flowmeter.

* * * * *